US010967867B2

(12) United States Patent
Vanholme et al.

(10) Patent No.: US 10,967,867 B2
(45) Date of Patent: Apr. 6, 2021

(54) METHOD AND APPARATUS FOR EFFICIENTLY PROVIDING OCCUPANCY INFORMATION ON THE SURROUNDINGS OF A VEHICLE

(71) Applicant: Bayerische Motoren Werke Aktiengesellschaft, Munich (DE)

(72) Inventors: Benoit Vanholme, Munich (DE); Michael Manz, Steinhoering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 790 days.

(21) Appl. No.: 15/005,258

(22) Filed: Jan. 25, 2016

(65) Prior Publication Data
US 2016/0137207 A1 May 19, 2016

Related U.S. Application Data

(63) Continuation of application No. PCT/EP2014/064694, filed on Jul. 9, 2014.

(30) Foreign Application Priority Data

Jul. 26, 2013 (DE) .................. 10 2013 214 632

(51) Int. Cl.
*B60W 40/04* (2006.01)
*G08G 1/16* (2006.01)
*B60W 30/095* (2012.01)

(52) U.S. Cl.
CPC ........ *B60W 40/04* (2013.01); *B60W 30/0956* (2013.01); *G08G 1/165* (2013.01); *G08G 1/166* (2013.01)

(58) Field of Classification Search
CPC .... B60W 30/0956; G08G 1/165; G08G 1/166
(Continued)

(56) References Cited

U.S. PATENT DOCUMENTS 5,006,988 A * 4/1991 Borenstein ........... G05D 1/0255
180/169
6,163,252 A * 12/2000 Nishiwaki ............. B60Q 9/006
340/435
(Continued)

FOREIGN PATENT DOCUMENTS

DE 10 2006 056 835 A1 6/2008
DE 10 2007 013 023 A1 9/2008
(Continued)

OTHER PUBLICATIONS

M. Yguel et al., "Efficient GPU-based Construction of Occupancy Grids Using several Laser Range-finders." International Conference on Intelligent Robots and Systems (Oct. 1, 2006), pp. 105-110, XP031006221.
(Continued)

*Primary Examiner* — Maceeh Anwari
(74) *Attorney, Agent, or Firm* — Crowell & Moring LLP

(57) ABSTRACT

A method is provided for efficiently providing occupancy information on the surroundings of a vehicle, which vehicle has sensors for ascertaining the occupancy of the surroundings. The method includes the following steps: receiving sensor measurements of the surroundings of the vehicle; determining the occupancy of the surroundings by obstacles using the sensor measurements; providing a division of the surroundings into regions; for each region of the surroundings, determining the most certainly identified occupancy in the respective region if multiple occupancies of the surroundings have been detected in the respective region; and determining the next occupancy, namely the respective region occupancy for which the shortest distance has been determined according to a distance determination specified for the respective region; and providing the most certainly identified occupancy and the next occupancy.

19 Claims, 2 Drawing Sheets

(58) Field of Classification Search
USPC .......................................................... 701/36
See application file for complete search history.

(56) References Cited

U.S. PATENT DOCUMENTS

2011/0149690 A1* 6/2011 Okuda .................... G01S 7/539
367/127
2014/0278049 A1 9/2014 Grewe et al.

FOREIGN PATENT DOCUMENTS

| DE | 10 2009 007 395 A1 | 10/2009 |
| EP | 1 672 390 A1 | 6/2006 |
| WO | WO 2011/047730 A1 | 4/2011 |
| WO | WO 2013/060323 A1 | 5/2013 |

OTHER PUBLICATIONS

International Search Report (PCT/ISA/210) issued in PCT Application No. PCT/EP2014/064694 dated Nov. 28, 2014 with English-language translation (six (6) pages).
German Search Report issued in counterpart German Application No. 10 2013 214 632.9 dated Mar. 21, 2014 with partial English-language translation (nine (9) pages).

* cited by examiner

METHOD AND APPARATUS FOR EFFICIENTLY PROVIDING OCCUPANCY INFORMATION ON THE SURROUNDINGS OF A VEHICLE

CROSS REFERENCE TO RELATED APPLICATIONS

This application is a continuation of PCT International Application No. PCT/EP2014/064694, filed Jul. 9, 2014, which claims priority under 35 U.S.C. § 119 from German Patent Application No. 10 2013 214 632.9, filed Jul. 26, 2013, the entire disclosures of which are herein expressly incorporated by reference.

BACKGROUND AND SUMMARY OF THE INVENTION

The invention relates to a method for efficiently providing occupancy information for the surroundings of a vehicle and to a computation apparatus that is set up accordingly. The invention resides in the field of surroundings identification.

Future motor vehicles will have a wealth of driver assistance systems that warn the driver of collisions and, if need be, also take action to attempt to avoid collisions. Examples of such driver assistance systems include: an emergency brake assist system, a lane departure warning system, a blind spot assist system, a parking assist system, and what is known as an adaptive cruise control (ACC) assist system, particularly for freeway travel. In order to provide these functions, knowledge of the surroundings of the vehicle is critical for such driver assistance systems. To this end, the surroundings are scanned or recorded using one or more sensors, such as radar, lidar, camera, ultrasonic sensors or similar sensors known from the prior art. Signal processing methods that are likewise known in the prior art can then be used to identify the occupancy of the surroundings by an obstacle. The occupancy indicates that the surroundings in this region cannot be traveled through by the vehicle.

To date, it has been known practice for the surroundings to be split into regular, preferably rectangular, regions, and for those regions of the surroundings that are occupied to be determined. This produces an occupancy grid. The document WO 2013/060323 describes such an occupancy grid. Such a system frequently has provision for the size of the regions to correspond to the highest respective demand on the driver assistance systems. This splitting of the surroundings provides very large volumes of data. At the same time, a decrease in the size of the regions for the purpose of data reduction can provide insufficient accuracy.

The object on which the invention is based is to efficiently provide occupancy information for the surroundings of a vehicle.

This and other objects are achieved by the method, the computer program and the computation apparatus according to embodiments of the invention.

In one aspect, a method for the efficient provision of occupancy information for the surroundings of a vehicle, wherein the vehicle includes sensors for determining the occupancy of the surroundings, includes the acts of: receiving sensor measurements of the surroundings of the vehicle; determining the occupancies of the surroundings by obstacles on the basis of the sensor measurements; providing a division of the surroundings into regions; for each region of the surroundings, if multiple occupancies of the surroundings have been identified in the respective region: determining the most certainly identified occupancy in the respective region; and determining the closest occupancy, namely that occupancy in the respective region for which the shortest distance has been determined as per a distance determination stipulated for the respective region; providing the most certainly identified occupancy and the closest occupancy. If only one occupancy has been determined in the respective region, this occupancy can be output as the most certainly identified occupancy and the closest occupancy. If no occupancy is identified in a region, the maximum range in which the sensors of the vehicle can identify occupancies can be output as the closest and most certain occupancy in the respective region. The most certainly identified occupancy and the closest occupancy can be provided in a Cartesian or polar coordinate system or in a mixture, depending on whether the identified occupancy is in front of or behind the vehicle in the direction of travel.

The method thus provides the most certainly identified occupancy and the closest occupancy per region. In this way, the surroundings of a vehicle can be described using less information. It is no longer necessary for all occupancies of the surroundings to be provided, and a reduction of the data is achieved. In this case, the reduction is chosen such that the information that is important to driver assistance systems is communicated. For many assistance systems, the closest occupancy and the most certainly identified occupancy are the most important basis for decision. By way of example, in a driver assistance system that automatically initiates evasive action, just the dubious presence of a closest occupancy can prevent action in the direction thereof. At the same time, action is initiated in the first place only on the basis of certainly identified occupancies. In other words, identification of the closest occupancy is optimized for prevention of initiation of an action (occupancies or obstacles must not be overlooked), whereas certain identification of occupancies is optimized for initiation of an action (occupancies or obstacles must be identified with a high level of probability). The provision of surroundings information thus demands less memory space and transmission time, and at the same time provides the necessary information. These properties are particularly advantageous for real-time systems, as are required in vehicles for controlling travel.

The size of the regions can be chosen according to the performance of the hardware. Each region can be regarded as a segment. When determining the occupancy, a probability of the respective presence can be established (occupancy probability). A certainly identified occupancy is one whose established probability exceeds a threshold value or whose probability is high in comparison with probabilities of other occupancies. An obstacle and an occupancy are a boundary for the free space for the vehicle. It is also possible for the individual regions to be split again and for the distance, the occupancy probability, the type, etc., to be indicated only for a subregion. If a region covers an angular range of 4°, for example, a subregion can be chosen in a step of 1°. In order to increase the accuracy of the angle indication, it is thus subsequently possible for the subregion (1-4) (2 bits) to be indicated too. A more accurate indication of this kind based on subregions can be provided at the request of a driver assistance system. In addition, it is also possible for attributes to be determined for identified occupancies, such as mobile, immobile, speed and a type classifier (vehicle, a pedestrian, etc.), if the vehicle additionally has obstacle identification.

In one development, regions in the direction of travel in front of the vehicle each cover an angular range (for example 5° to 10° or 15° to 18° in a polar coordinate system centered on the vehicle) from the vehicle, particularly an angular range in a polar coordinate system that has its origin in the vehicle (in a point on the vehicle). Hence, the occupancy information is reduced for angular ranges in front of the vehicle. This is advantageous because the occupancy indication for angular ranges corresponds to the decision options when driving, namely the choice of direction of travel. Furthermore, for an angle indication in a polar coordinate system, the representation close to the vehicle is more accurate. Hence, the indication of the occupancy information is reduced in a manner that takes account of the end function of driver assistance systems, i.e. controlling (direction of) travel. For the regions in the direction of travel in front of the vehicle, the distance is determined on the basis of the range of the occupancy from the vehicle. This distance, in a polar coordinate system, is the distance in the polar coordinate system representation.

In a further development, the angular range that is covered by each of the regions in a first group is smaller than the angular range that is covered by each of the regions in a second group. Different regions therefore have different sizes. This can be used to further reduce the volumes of data by defining larger regions in regions in which occupancy information in a particularly fine resolution is not required.

In particular, the regions in the first group can adjoin one another and overlie the longitudinal axis of the vehicle in the direction of travel in front of the vehicle. Hence, the section of the vehicle that is centrally in front of the vehicle in the direction of travel is depicted more finely than the regions at the sides in front of the vehicle. This allows the use of resources for those sections of the vehicle surroundings that are particularly important for driver assistance systems that control (direction of) travel. A driver assistance function that plans a future trajectory of travel for highly automated freeway driving, for example, requires more accurate information about occupancies in the central front section of the surroundings than about occupancies that are at the sides slightly in front of the vehicle.

In a preferred implementation, regions in the direction of travel behind the vehicle each cover a range of values on the axis of abscissae (x axis) in a Cartesian coordinate system, the axis of abscissae being oriented in the longitudinal direction of the vehicle. The choice of regions that are chosen according to a Cartesian coordinate system, that is to say can resemble a rectangle, makes sense particularly for the rear region of a vehicle. When reversing during parking maneuvers or when observing the traffic behind on roads, identification of obstacles in a Cartesian grid is advantageous. The regions can each indicate 0.5 m, 2 m or 10 m bands, so that the first region covers occupancies with values from 0 m to 1 m on the abscissa, the next region covers values from 1 m to 2 m, etc., for example.

The distance for an occupancy can be determined by the value of the occupancy on the axis of ordinates (y axis) in the Cartesian coordinate system. If the position of the occupancy is given by a pair of values (x/y) in the Cartesian coordinate system, the y value can simply be taken as the distance directly. This is a variant that is particularly effective in terms of computation.

In a development, the respective regions in the direction of travel behind the vehicle are each situated either to the left or right of the axis of abscissae. In this development, regions having a positive distance and having a negative distance are thus distinguished. The division becomes finer.

In a variant, regions in the direction of travel behind the vehicle each cover a range of the values on the axis of abscissae in a curvilinear Cartesian coordinate system, namely a coordinate system in which the axis of abscissae is formed by the path that the vehicle has taken, and all points on the axis of ordinates, namely a straight line perpendicular to the axis of abscissae, are assigned the same value on the axis of abscissae.

Hence, instead of a Cartesian coordinate system, a curved variant, as it were, of the Cartesian coordinate system is used, with the axis of abscissae in the Cartesian coordinate system being situated on the path that the vehicle has taken. The x value of an occupancy is then computed by (pointwise) perpendicular projection of the occupancy onto the x axis. Such a coordinate system is called curvilinear. In the rear region, the curvilinear representation (based on the ego trajectory) has the best suitability, since the past road is known and thus the right and left sides of the road can be kept clearly apart. Furthermore, this condition is particularly suitable for functions based thereon such as a lane change assist system, etc. For small regions of perception behind the vehicle, a linear representation can be used instead of the curvilinear representation. The cited advantages also apply to the Cartesian representation for straight sections of travel and, in attenuated form, also to cornering. The distance for an occupancy for the regions can be determined by the value of said occupancy on the axis of ordinates in the coordinate system, that is to say by the (pointwise) perpendicular projection of the occupancy onto the x axis.

The method can be extended by the following: combining the most certainly identified occupancies of multiple regions to form one continuous occupancy and/or combining closest occupancies of multiple regions to form a further continuous occupancy. In this way, frequently occurring boundaries, such as guardrails, or walls of buildings, can be described in practice. This information can provide assistance systems with supplementary information for longer-term journey planning and can possibly allow interpolations.

In a further aspect, a computer program is set up to prompt a computer, when executed, to carry out a method according to the invention.

In another aspect, a computation apparatus is set up to carry out one of the above methods. The computation apparatus may be a computer having a stored computer program, or an application-specific circuit.

Other objects, advantages and novel features of the present invention will become apparent from the following detailed description of one or more preferred embodiments when considered in conjunction with the accompanying drawings.

BRIEF DESCRIPTION OF THE DRAWINGS

Identical reference symbols relate to corresponding elements throughout the figures.

DETAILED DESCRIPTION OF THE DRAWINGS

Figure 1:
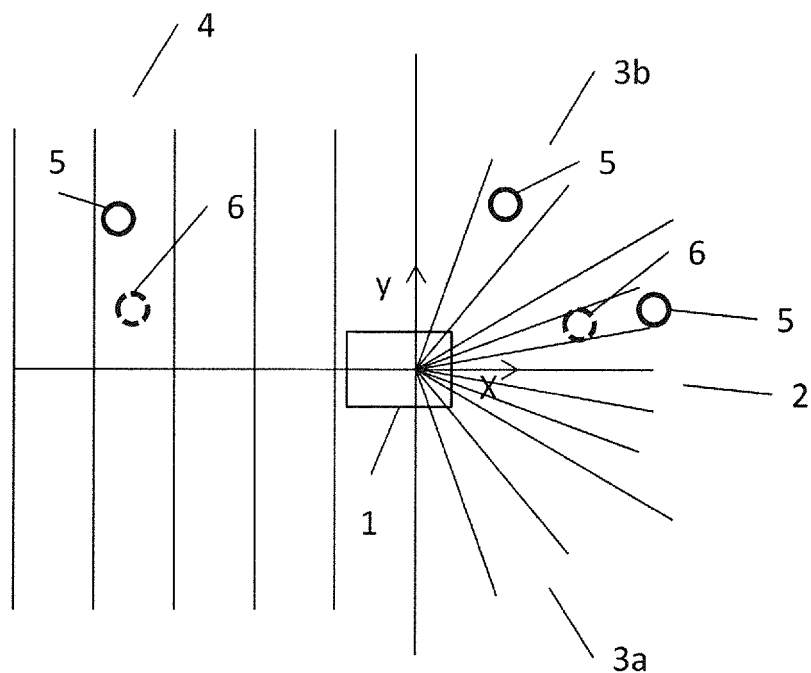
FIG. 1 schematically shows a division of the surroundings into regions according to an exemplary embodiment of the invention.

FIG. 1 schematically shows a division of the surroundings of a vehicle 1 into regions according to an exemplary embodiment. The vehicle 1 has sensors for surroundings identification and a computation apparatus for producing a surroundings map that indicates occupancies. To divide the surroundings, the surroundings are divided into four sections 2, 3a, 3b and 4. In sections 2, 3a and 3b, which are situated essentially in front of the vehicle 1 in the direction of travel, regions are used that cover an angular range from the vehicle, for which purpose a polar coordinate system is used. In section 4, which is situated essentially behind the vehicle 1, regions based on a Cartesian coordinate system are used, each region covering a range on the axis of abscissae in the Cartesian coordinate system (regardless of the value of the occupancy on the axis of ordinates). In sections 3a and 3b, which are at the front right and left sides of the vehicle, an angular range has a magnitude of 20° in each case. In section 2, an angular range has a magnitude of 10° in each case. In section 2, the division is therefore finer.

The sensor measurements by the vehicle 1 are used to determine the occupancies of the surroundings of the vehicle 1. The result of this determination is a statement about the location of an occupancy and the probability of the determination being certain. To indicate the occupancies (for use by assistance systems, for example), only the closest determined occupancy is provided for each region, however, regardless of the probability with which it has been identified, and that identified occupancy that has been determined with the highest probability (most certainly) in the respective region. This decreases the memory requirement for the resultant volume of data on account of selection of information to be indicated that is oriented to the requirements of the driver assistance systems. FIG. 1 represents the closest occupancies 6 by means of dashed circles. The most certainly identified occupancies 5 are shown by circles in a solid line. When the most certainly identified occupancy is also simultaneously the closest, only this one occupancy is indicated in the respective region.

Figure 2:
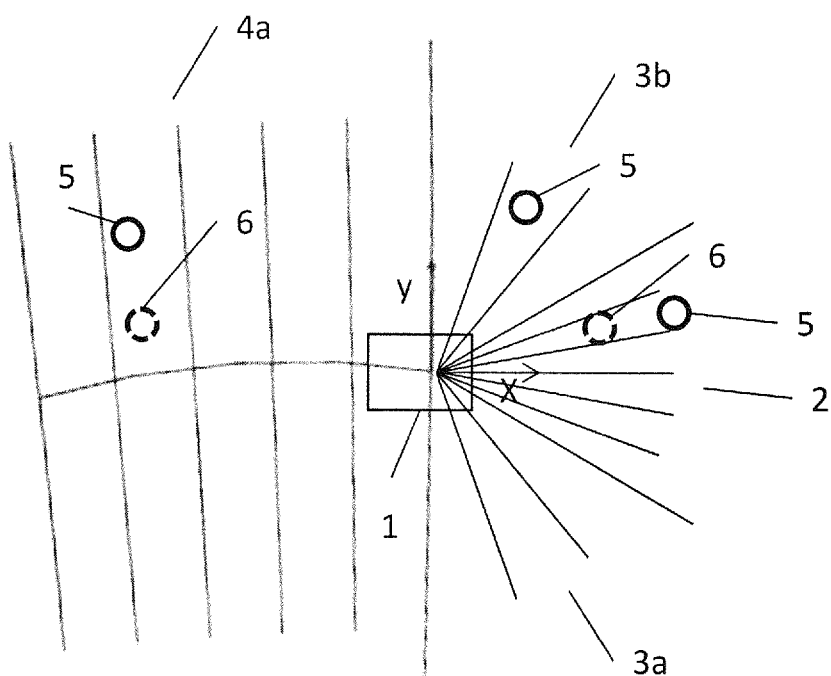
FIG. 2 schematically shows a further division of the surroundings into regions according to a further exemplary embodiment of the invention.

FIG. 2 schematically shows a further division of the surroundings into regions according to a further exemplary embodiment. This example is based on that of FIG. 1, the indications in section 4a being provided not in a Cartesian coordinate system but rather in a curvilinear coordinate system. In this case, the trajectory that forms the curved axis of abscissae (x axis) corresponds to the path on which the vehicle has traveled. Section 4a is also divided into regions, these running perpendicular to the trajectory.

Figure 3:
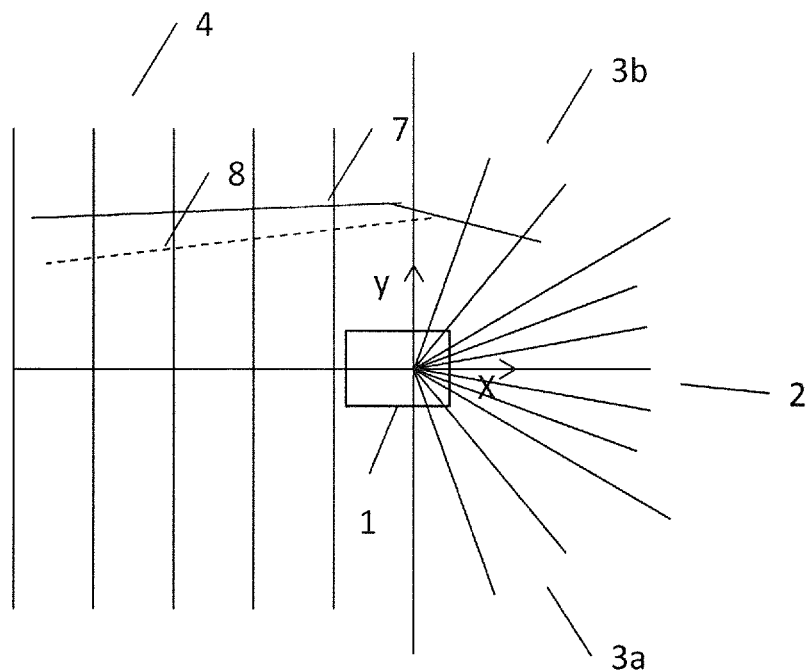
FIG. 3 schematically shows a variant of the identification of occupancies in the surroundings according to an exemplary embodiment of the invention.

FIG. 3 schematically shows a variant for the determination of occupancies in the surroundings according to an exemplary embodiment. The computation apparatus connects determined occupancies throughout the regions to form free space boundaries. For these continuous free space boundaries too, a distinction is drawn between the closest identified boundary 8 and the most certainly identified boundary 7. Provision may be made for only these two boundaries to be provided, in order to match the processing to the performance of the computation systems.

Figure 4:
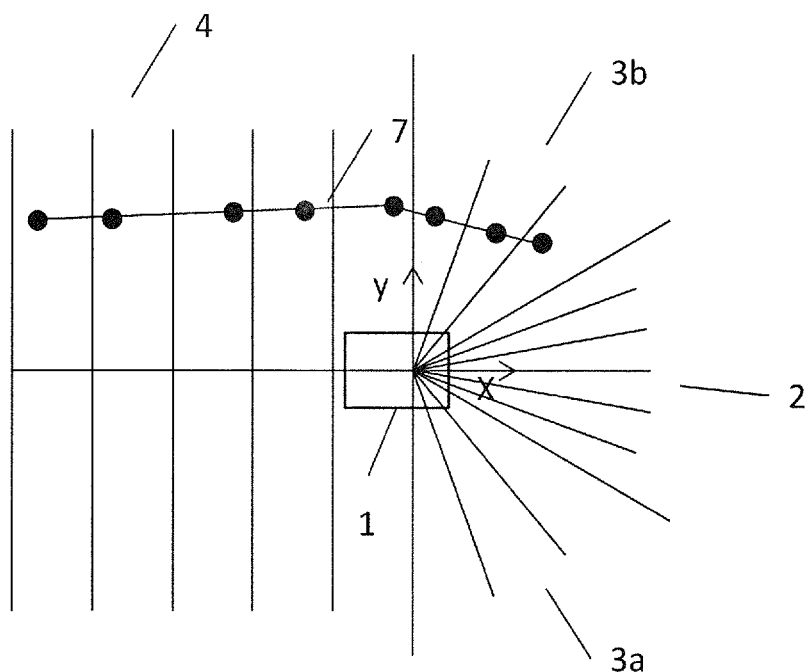
FIG. 4 schematically shows a further variant of the identification of occupancies in the surroundings according to a further exemplary embodiment of the invention.

FIG. 4 schematically shows a further variant for the identification/determination of occupancies in the surroundings according to a further exemplary embodiment. In this further variant, single identified adjacent occupancies are combined to form a polyline. Such a line can provide a good description of road boundaries or walls of buildings, for example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing occupancy information for surroundings of a vehicle, wherein the vehicle comprises: sensors for determining occupancy of the surroundings, and a computation apparatus for producing a surroundings map that indicates occupancies, the method comprising the following acts executed by the computation apparatus:
    receiving, from the vehicle sensors, sensor measurements of the surroundings of the vehicle;
    determining the occupancies of the surroundings by obstacles based on the sensor measurements;
    dividing the surroundings into regions; and
    for each region of the surroundings:
        identifying multiple occupancies of the surroundings in the respective region;
        determining a most certainly identified occupancy of the identified multiple occupancies in the respective region and a closest occupancy of the identified multiple occupancies, which closest occupancy is that occupancy in the respective region for which a shortest distance to the vehicle has been determined according to a distance determination specified for the respective region; and
        providing the most certainly identified occupancy and the closest occupancy to a driver assistance system of the vehicle.

2. The method according to claim 1, wherein regions in a direction of travel in front of the vehicle each cover an angular range from the vehicle.

3. The method according to claim 2, wherein the angular range is an angular range in a polar coordinate system that has an origin in the vehicle.

4. The method according to claim 2, wherein the distance for the regions is determined based on a range of the occupancy from the vehicle.

5. The method according to claim 2, wherein the angular range covered by each of the regions in a first group is less than the angular range covered by each of the regions in a second group.

6. The method according to claim 5, wherein the regions in the first group adjoin one another and overlay a longitudinal axis of the vehicle in a direction of travel in front of the vehicle.

7. The method according to claim 6, wherein regions in a direction of travel behind the vehicle each cover a range of values on the axis of abscissae in a Cartesian coordinate system, the axis of abscissae being oriented in the longitudinal direction of the vehicle.

8. The method according to claim 1, wherein regions in a direction of travel behind the vehicle each cover a range of values on the axis of abscissae in a Cartesian coordinate system, the axis of abscissae being oriented in the longitudinal direction of the vehicle.

9. The method according to claim 7, wherein the distance for an occupancy for the regions in the direction of travel behind the vehicle is determined by a value of the occupancy on the axis of ordinates in the Cartesian coordinate system.

10. The method according to claim 7, wherein respective regions in the direction of travel behind the vehicle are each situated either to a left or a right of the axis of abscissae.

11. The method according to claim 9, wherein respective regions in the direction of travel behind the vehicle are each situated either to a left or a right of the axis of abscissae.

12. The method according to claim 6,
wherein regions in a direction of travel behind the vehicle each cover a range of values on the axis of abscissae in a curvilinear Cartesian coordinate system which is a coordinate system in which the axis of abscissae is defined by a path the vehicle has taken; and
wherein all points on the axis of ordinates, which is a straight line perpendicular to the axis of abscissae, are assigned a same value on the axis of abscissae.

13. The method according to claim 1,
wherein regions in a direction of travel behind the vehicle each cover a range of values on the axis of abscissae in a curvilinear Cartesian coordinate system which is a coordinate system in which the axis of abscissae is defined by a path the vehicle has taken; and
wherein all points on the axis of ordinates, which is a straight line perpendicular to the axis of abscissae, are assigned a same value on the axis of abscissae.

14. The method according to claim 12, wherein the distance for an occupancy for the regions in the direction of travel behind the vehicle is determined by a value of a occupancy on the axis of ordinates in the curvilinear Cartesian coordinate system.

15. The method according to claim 1, further comprising the act of:
combining the most certainly identified occupancies of multiple regions to form one continuous occupancy.

16. The method according to claim 15, further comprising the act of:
combining the closest occupancies and the most certainly identified occupancies to form a further continuous occupancy.

17. The method according to claim 1, further comprising the act of:
combining the closest occupancies of multiple regions to form a further continuous occupancy.

18. A computer product comprising a non-transitory computer readable medium having stored thereon program code segments that, when executed, cause a computer to:
receive sensor measurements of the surroundings of the vehicle;
determine occupancies of the surroundings by obstacles based on the sensor measurements;
divide the surroundings into regions;
for each region of the surroundings:
identify multiple occupancies of the surroundings in the respective region:
determine a most certainly identified occupancy of the identified multiple occupancies in the respective region and the closest occupancy of the identified multiple occupancies, which closest occupancy is that occupancy in the respective region for which a shortest distance to the vehicle has been determined according to a distance determination specified for the respective region; and
provide the most certainly identified occupancy and the closest occupancy to a driver assistance system of the vehicle.

19. A computation apparatus, comprising a processor and associated memory configured to execute a program to:
receive sensor measurements of the surroundings of the vehicle;
determine occupancies of the surroundings by obstacles based on the sensor measurements;
divide the surroundings into regions;
for each region of the surroundings:
identify multiple occupancies of the surroundings in the respective region:
determine a most certainly identified occupancy of the identified multiple occupancies in the respective region and the closest occupancy of the identified multiple occupancies, which closest occupancy is that occupancy in the respective region for which a shortest distance to the vehicle has been determined according to a distance determination specified for the respective region; and
(b) provide the most certainly identified occupancy and the closest occupancy to a driver assistance unit.

* * * * *